Patented Sept. 8, 1942

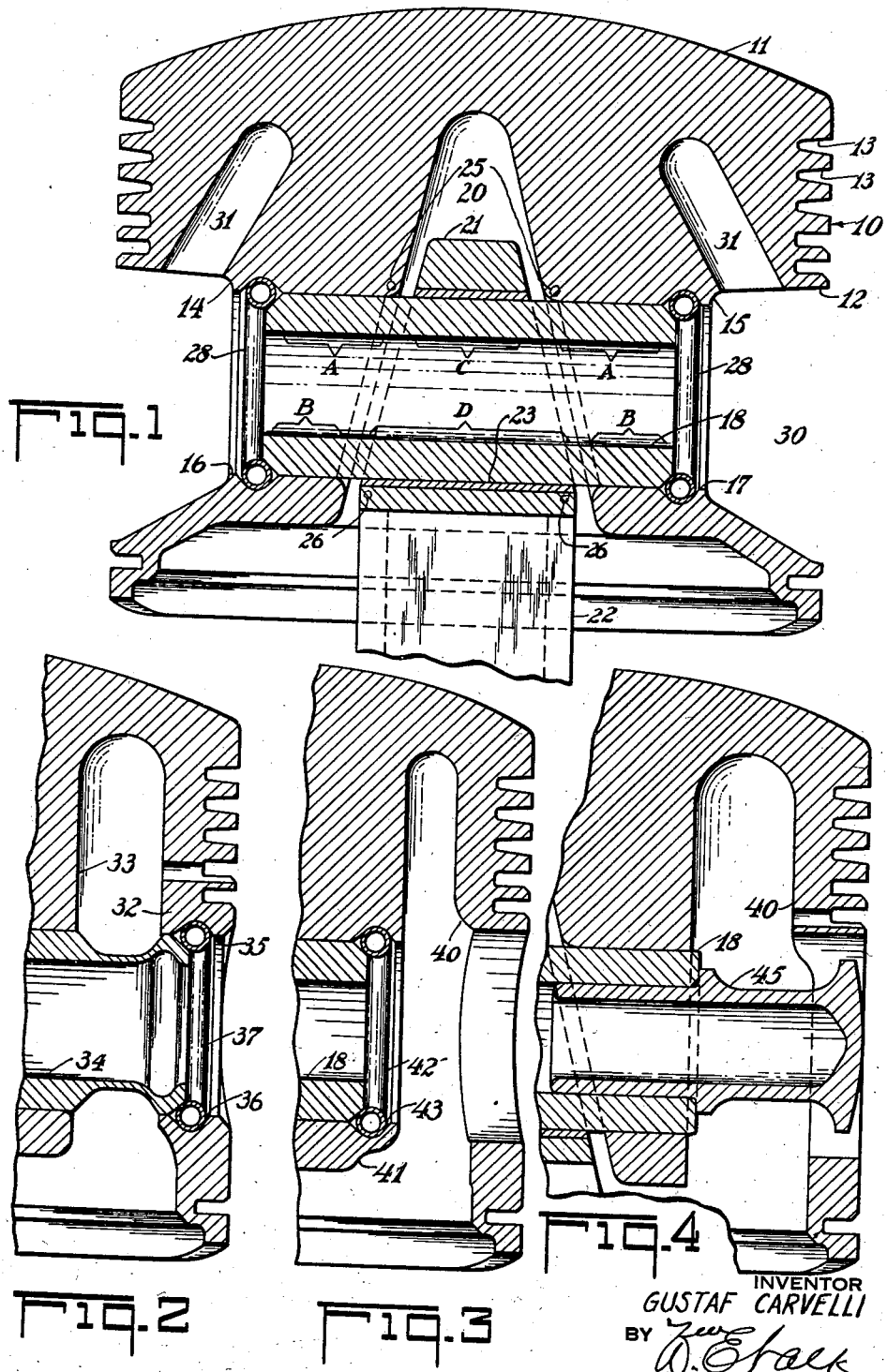

2,295,199

UNITED STATES PATENT OFFICE 2,295,199

PISTON

Gustaf Carvelli, Ridgewood, N. J., assignor to Wright Aeronautical Corporation, a corporation of New York Application December 27, 1941, Serial No. 424,559

3 Claims. (Cl. 309—19)

This invention relates to pistons and is more particularly concerned with a piston and connecting rod arrangement adapted for use in internal combustion engines. A particular object of the invention is to provide a construction in which bending stresses in a piston pin may be materially reduced, and an associated object is to reduce bearing loads on the piston and connecting rod bearing surfaces, and to reduce shear loads and ovalization stresses in the piston pin which connects a piston and connecting rod.

A further object is to provide an arrangement affording an improved stress distribution in a piston-connecting rod connection, to minimize bending moments upon the piston structure, and to permit of a reduction in weight of both the piston and pin.

Further objects of the invention will become apparent in reading the detailed description below in connection with the drawing, in which:

Fig. 1 is an axial section through an internal combustion engine piston including a portion of a connecting rod and a piston pin;

Figs. 2, 3, and 4 are fragmentary sections through alternate designs of pistons.

Referring first to Fig. 1, a piston 10 comprises a head 11 having an annular depending skirt 12 in which grooves 13 are cut to receive the conventional piston rings. From the inner portion of the head 11, piston pin bosses 14 and 15 depend, these bosses being provided with coaxial bores 16 and 17 to receive a piston pin 18. The inner faces of the bosses 14 and 15 are plane, and are slanted from a plane normal to the piston pin axis to form a wedge-shaped cavity 20 into which a correspondingly wedge-shaped end 21 of a connecting rod 22 is loosely fitted with the looseness necessary for free articulation of the rod with respect to the piston. The rod end 21 is provided with a bore 23 through which the piston pin 18 passes, so that the piston pin forms an articulating connection between the piston and the connecting rod. In virtue of the sloped inner ends of the bosses 14 and 15 and the correspondingly sloped end faces of the rod end 21, the upper bearing length between the pin and each boss is substantially longer than the lower bearing length between the piston and each boss, as may be readily seen at points A and B. Likewise, the upper bearing length between the connecting rod and the piston pin is considerably shorter than the lower bearing length between the rod and piston pin, as at C and D respectively. It will likewise be seen that the bearing portion A overlaps the bearing portion D so that a part of the downward stress imposed on the piston head is transmitted directly in compression, through the piston pin, diminishing the shear stress which would occur between the piston bosses on the rod ends in conventional constructions. The center of pressure of the load at each zone A is much closer to the center of pressure on the zone D than would be possible in conventional constructions and therefore, due to the short moment arm afforded by the overlapping bearings, bending moments on the piston pin 18 are very materially diminished.

Since the ratio of compressive load to tensile load between the piston and rod is about 5 to 1, the diminution in area in the zones B and C of the piston bosses and connecting rod is of no material importance.

By following the teachings above described, it will be apparent that two modes of design are possible. In one, if a piston pin of standard length is taken, the bearing areas of the highly loaded zones A and D may be materially increased by sloping the inner ends of the pin bosses and the outer ends of the connecting rod end, at the same time reducing bending stresses in the piston pin and reducing shear and other loads in the system. The second mode of design would consist in utilizing a shorter piston pin than is usual and in leaving the bearing areas at A and D substantially the same as was used in a known design. The shorter piston pin may of course be lighter in weight and at the same time the reductions in bending shear and other stresses above mentioned are secured. In shortening the piston pin and in bringing the centers of pressure of the two zones A closer together, these centers of pressure may be caused to lie directly beneath the centers of pressure on the two halves of the piston head on opposite sides of a diametral plane normal to the piston pin, whereby bending moments in the piston structure itself may be eliminated. The center of pressure on half of the piston head is of course at the center of gravity of the semicircular area thereof.

Probably the most important consideration now apparent is, that by reducing bending moments and deflections in the piston pin, load concentrations in the bosses 16 and 17, at the points 25 and 26 (which are filleted as shown) are greatly diminished so that even though conventional bearing pressures might be adhered to in the design of the assembly, the effective capacity of the bearing between the bosses and the pin, and between the pin and the connecting rod, is considerably increased since the load distribution will be substantially uniform throughout the bearing length. In conventional designs, the bearing load distribution is non-uniform on account of piston pin bending deflection.

In Fig. 1, piston pin retention is afforded by means of retainers 28 sprung into grooves in the outer ends of the boss bores 16 and 17. Since the piston pin is very short, much less than the diameter of the piston, the piston skirt 12 may be cut away as at 30 at the ends of the pin to reduce weight. With such large cutaway, lightening grooves 31 may be incorporated for added weight reduction.

Figs. 2, 3, and 4 contemplate the use of the same wedge-shaped space 20 between the piston bosses, and the same wedge-shaped end on the connecting rod, as is shown in Fig. 1. However, the skirt and pin retention means in Figs. 2, 3, and 4 are different from Fig. 1.

In Fig. 2, a piston skirt 32 extends from the top to the bottom of the piston, separated from the bosses 33, and embraces the bosses rather than being cut away as in the first figure. The piston pin 34 is borne in the boss 33 but is extended axially in lightened form to the skirt 32, which is provided with a hole 35 having a groove 36 for reception of a lock ring 37. In this arrangement, accessibility of the lock ring 37 is great, facilitating assembly and disassembly of the piston pin with respect to the piston.

Fig. 3 is in effect, a compromise between showings of Figs. 1 and 2. The skirt 40 is separate from the boss as in the case of Fig. 2, but retention of the piston pin 18 is made in the boss 41 through the medium of a spring retainer 42 snapped into a groove 43 in the boss 41 and engaging the end of the pin 18.

In the arrangement of Fig. 4, the teachings of Fig. 3 have been followed except that, in lieu of a spring retainer such as 42, an end plug 45 is inserted into the end of the hollow piston pin 18, which plug extends axially to the surface of the piston skirt and locates the pin axially. Preferably, a plug such as 45 would be fabricated from light metal rather than from steel as would be used in the piston pin.

In any one of the pistons of Figs. 2, 3, and 4, the skirt at one end of the piston pin may be continuous to provide axial location of the piston pin without the need for a retainer. In such an arrangement, the pin would be inserted and withdrawn from one side of the piston, and but one pin retaining ring or plug would be required.

In addition to the advantages of the invention mentioned heretofore, it will be apparent to those skilled in the art that specific piston designs may be made to reduce piston weight by removing metal therefrom at points where it is structurally unnecessary, while maintaining good heat transfer characteristics and adequate material in the piston head and skirt.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An integral piston comprising a head, a skirt depending therefrom, spaced bosses depending from the head in spaced relation to said skirt, alined bores through the skirt and bosses, a piston pin engaging and bridging the space between said bosses, and a plug in a pin end bridging the space between the boss and skirt projecting through the skirt opening to substantially flush relationship with the skirt surface.

2. In a piston, a head having an integral skirt depending therefrom, bearing bosses integral with the head and depending therefrom, the bosses being spaced inwardly from the skirt and having alined pin bores, the skirt having a hole alined with said bores, a piston pin inserted through said skirt hole and engaging the boss bores, the journal portion of the piston pin terminating substantially at the ends of said bosses, and an axial locator for said pin comprising an extension rigid therewith, bridging the space between the boss and skirt and having a convex outer end, part of which lies substantially flush with the skirt outer surface.

3. A piston having a head and an integral skirt, pin bosses integral with and depending from the head in spaced relation to said skirt, said bosses having alined bores and said skirt having a hole alined with said bores, a piston pin engaging within said boss bores, and an extension rigid with the pin bridging the space between a boss and the skirt and passing partway through the skirt hole.

GUSTAF CARVELLI.